Figure 1:
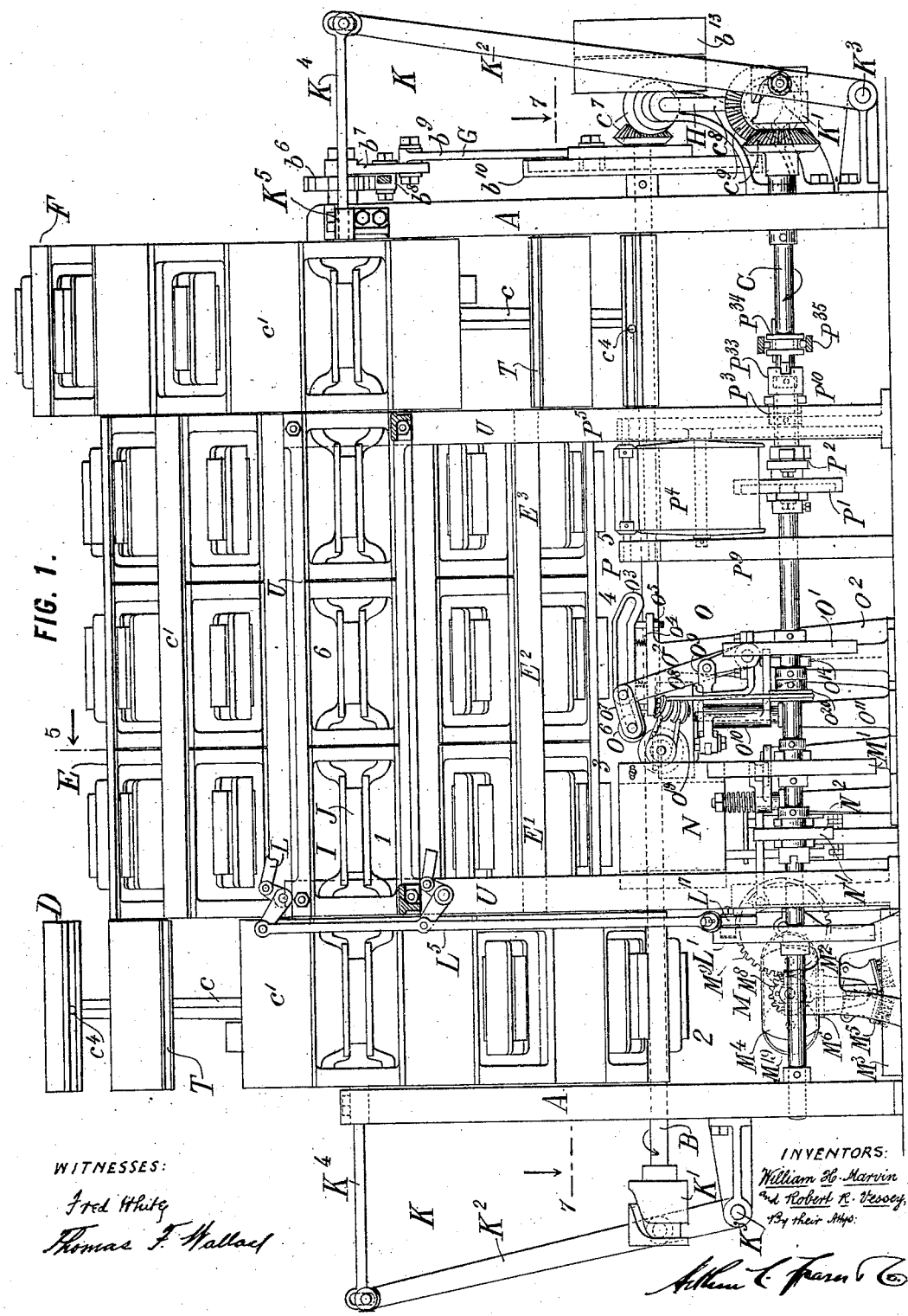

No. 848,563. PATENTED MAR. 26, 1907.
W. H. MARVIN & R. R. VESSEY.
MACHINE FOR MANUFACTURING BOOKS.
APPLICATION FILED MAY 5, 1898.

12 SHEETS—SHEET 3.

WITNESSES:
Fred White
J. F. Wallace

INVENTORS:
William H. Marvin
and Robert R. Vessey,
By their Attys

No. 848,563. PATENTED MAR. 26, 1907.
W. H. MARVIN & R. R. VESSEY.
MACHINE FOR MANUFACTURING BOOKS.
APPLICATION FILED MAY 5, 1898.

12 SHEETS—SHEET 4.

WITNESSES:
Fred White
T. F. Wallace

INVENTORS:
William H. Marvin,
and Robert R. Vessey,
By their Attys.
Arthur C. Fraser & Co.

No. 848,563. PATENTED MAR. 26, 1907.
W. H. MARVIN & R. R. VESSEY.
MACHINE FOR MANUFACTURING BOOKS.
APPLICATION FILED MAY 5, 1898.

12 SHEETS—SHEET 6.

WITNESSES:
INVENTORS:

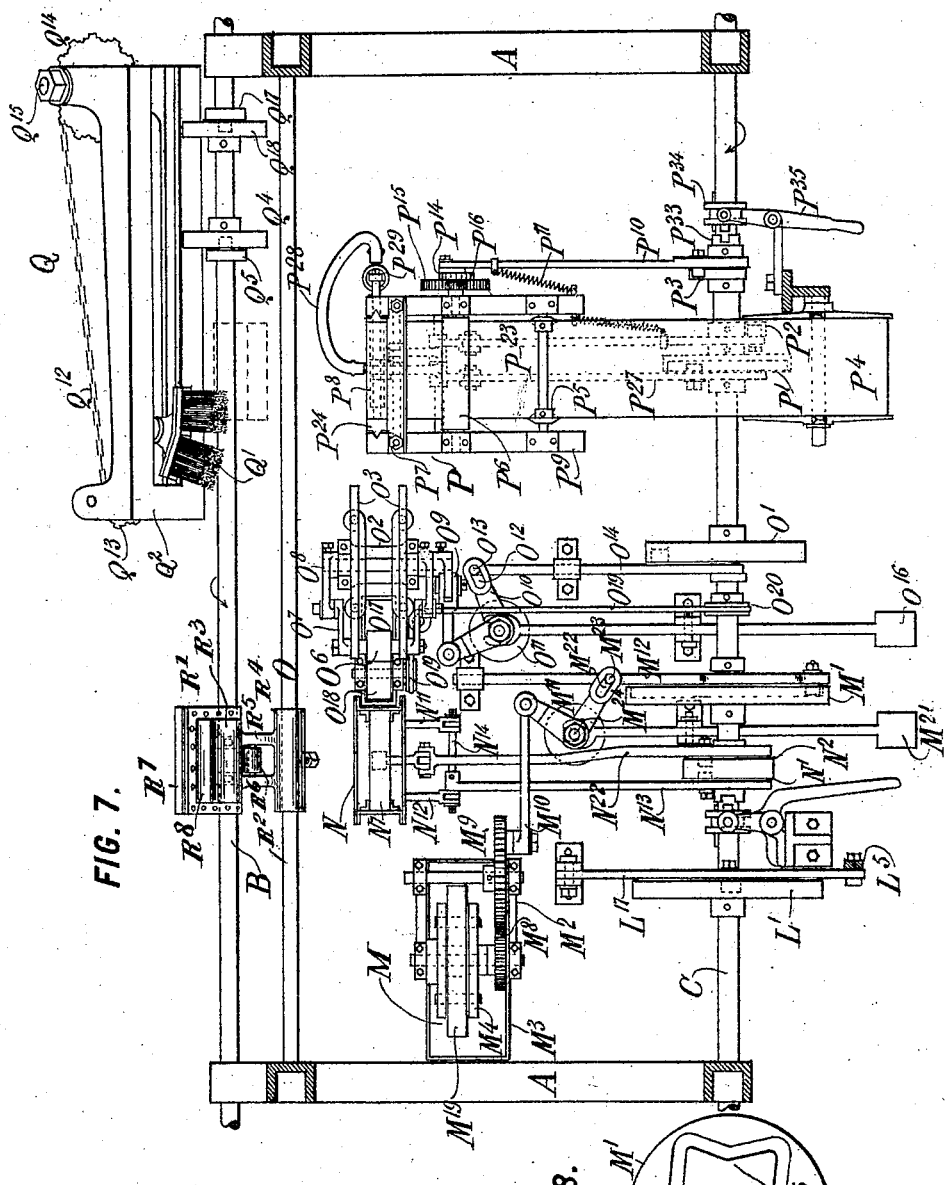

No. 848,563. PATENTED MAR. 26, 1907.
W. H. MARVIN & R. R. VESSEY.
MACHINE FOR MANUFACTURING BOOKS.
APPLICATION FILED MAY 5, 1898.
12 SHEETS—SHEET 8.
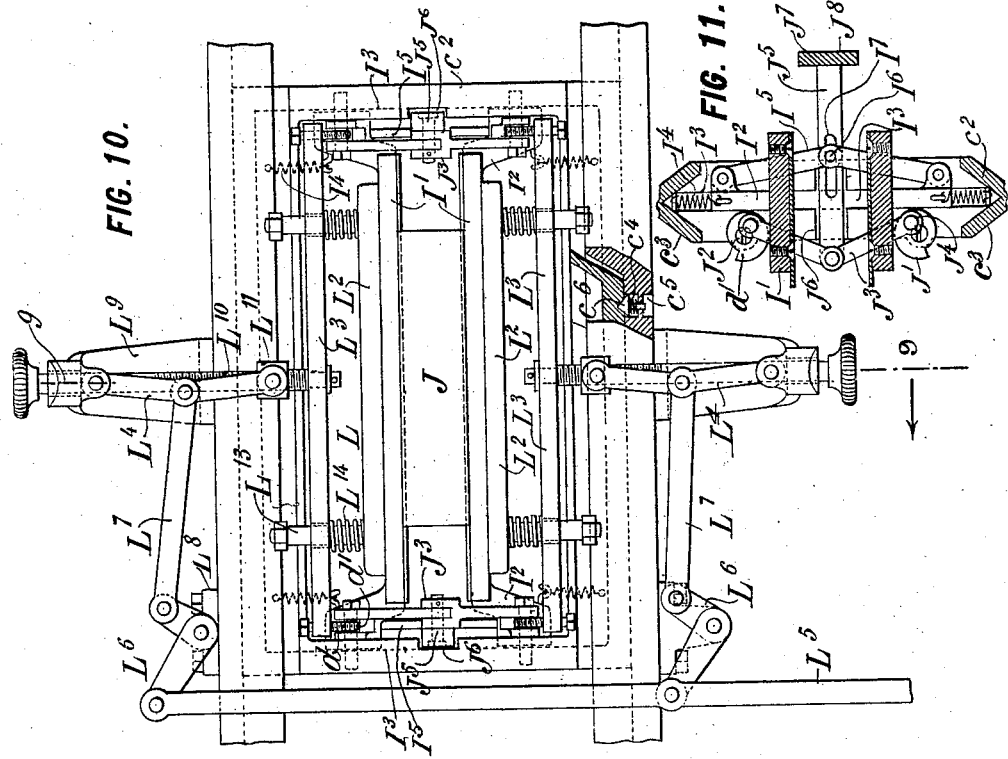
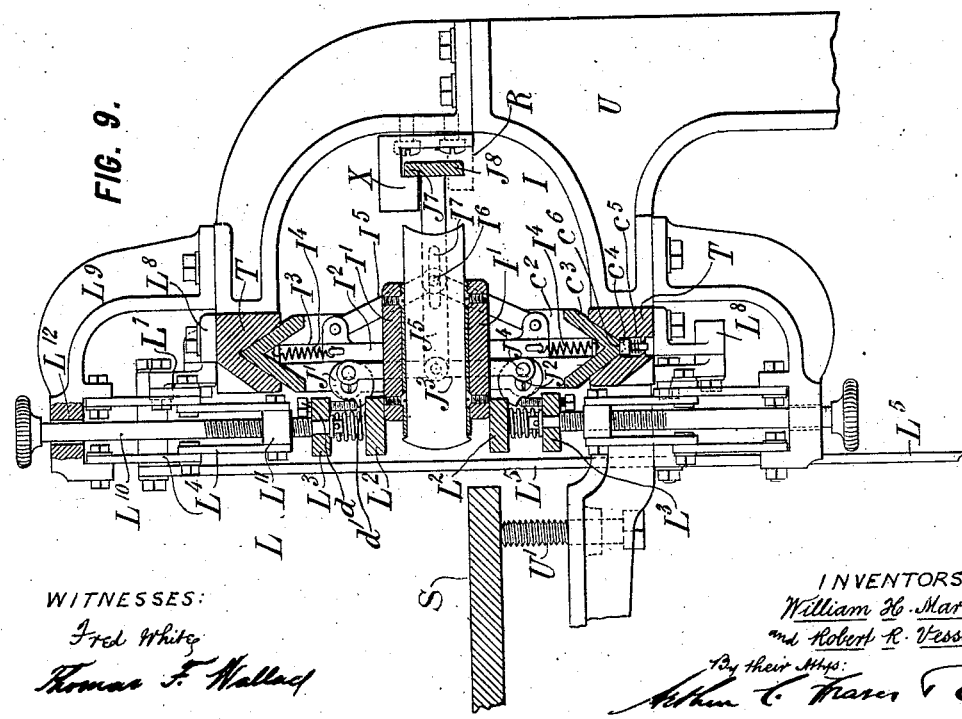
WITNESSES:
Fred White
Thomas F. Wallace
INVENTORS:
William H. Marvin,
and Robert R. Vessey,
By their Attys.

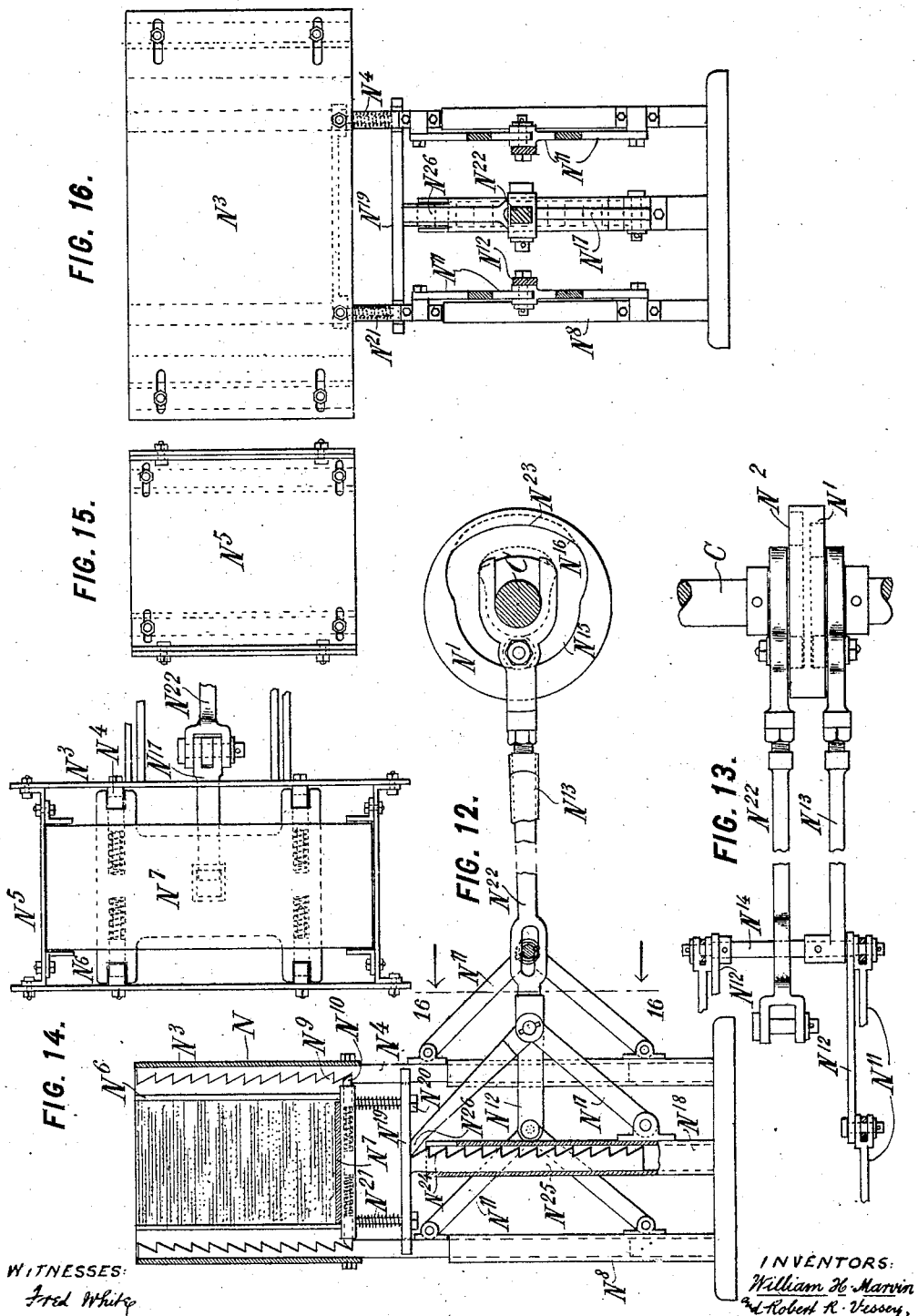

No. 848,563. PATENTED MAR. 26, 1907.
W. H. MARVIN & R. R. VESSEY.
MACHINE FOR MANUFACTURING BOOKS.
APPLICATION FILED MAY 5, 1898.
12 SHEETS—SHEET 10.
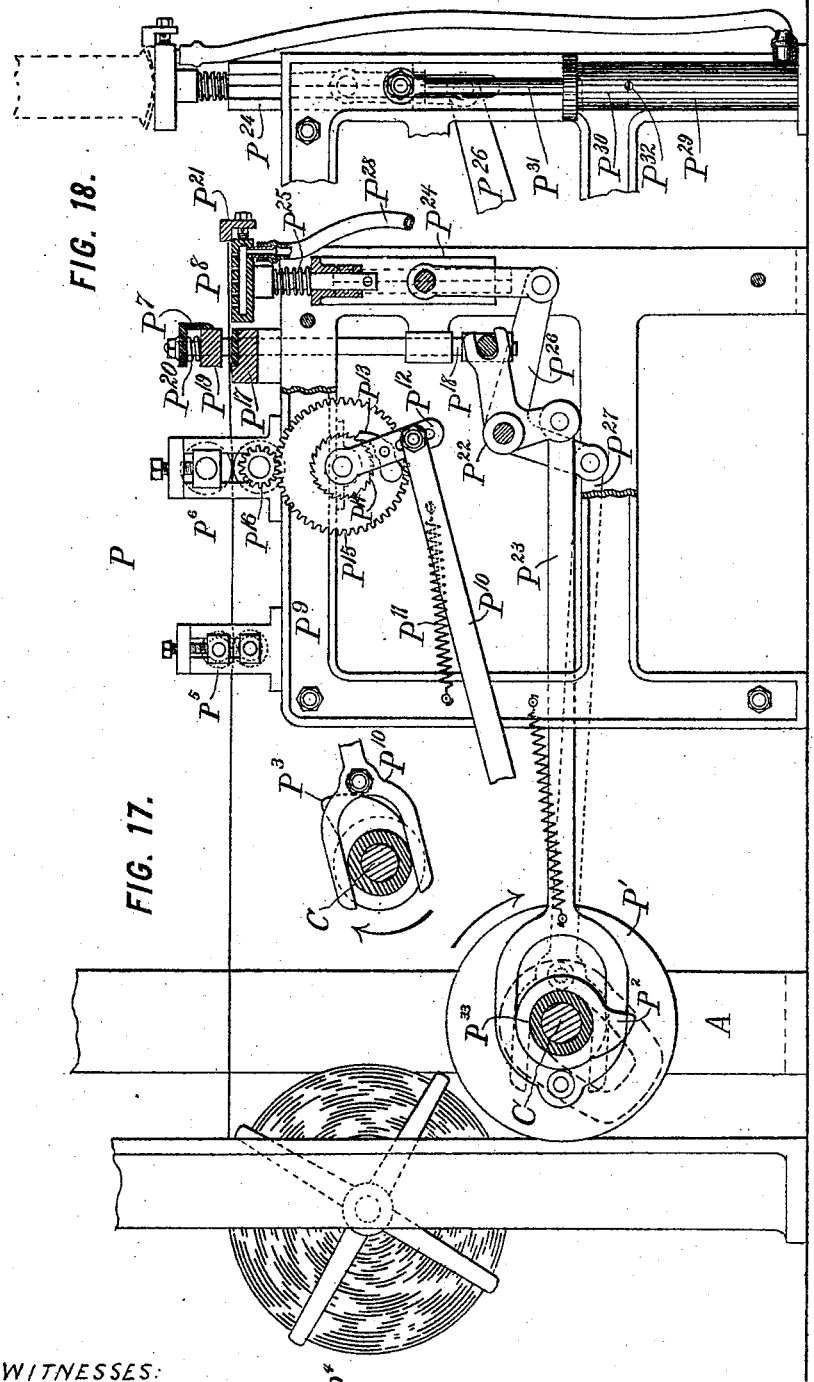

No. 848,563. PATENTED MAR. 26, 1907.
W. H. MARVIN & R. R. VESSEY.
MACHINE FOR MANUFACTURING BOOKS.
APPLICATION FILED MAY 5, 1898.
12 SHEETS—SHEET 11.
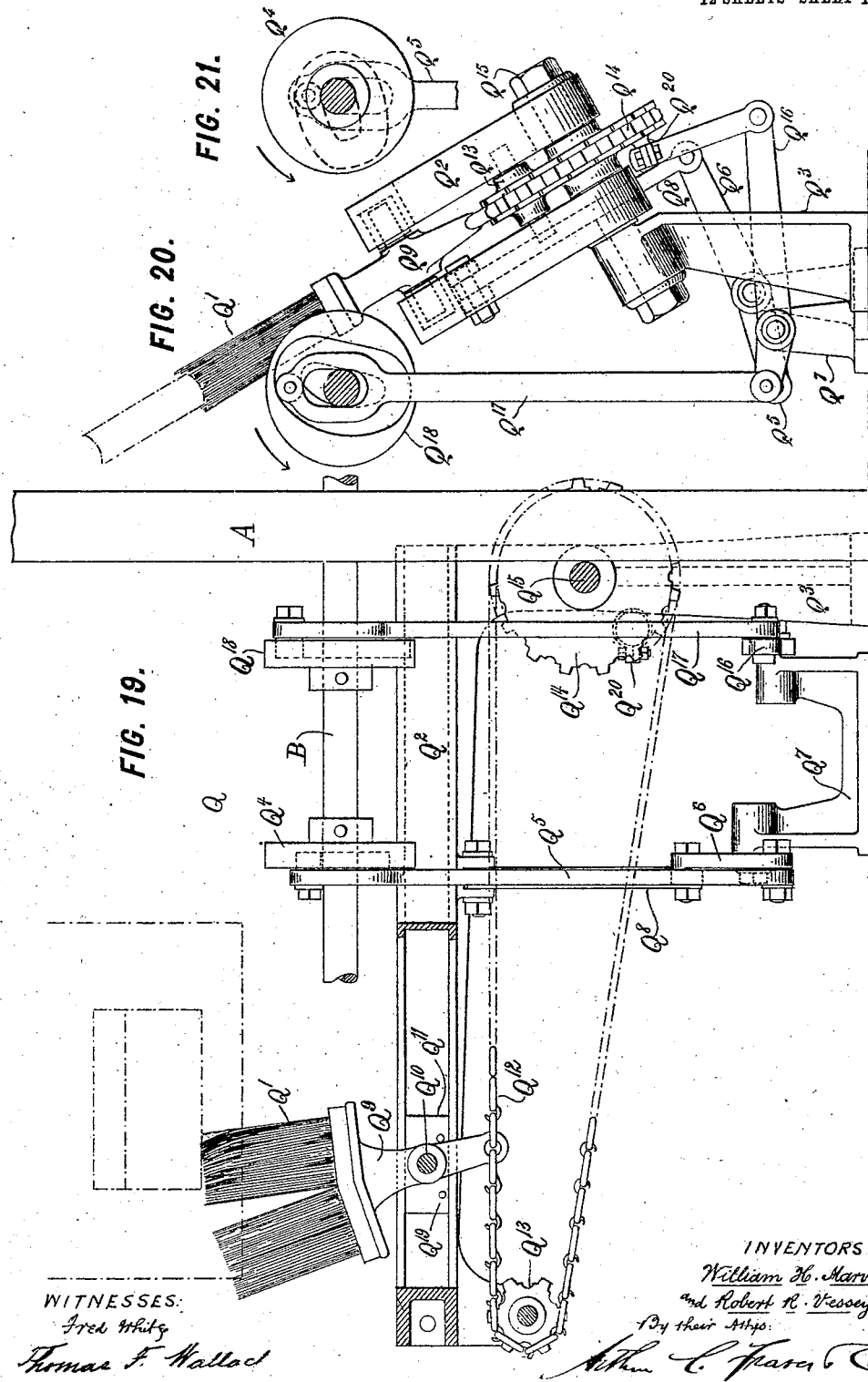
WITNESSES:
Fred White
Thomas F. Wallod
INVENTORS:
William H. Marvin
and Robert R. Vessey,
By their Attys.

No. 848,563. PATENTED MAR. 26, 1907.
W. H. MARVIN & R. R. VESSEY.
MACHINE FOR MANUFACTURING BOOKS.
APPLICATION FILED MAY 5, 1898.
12 SHEETS—SHEET 12.
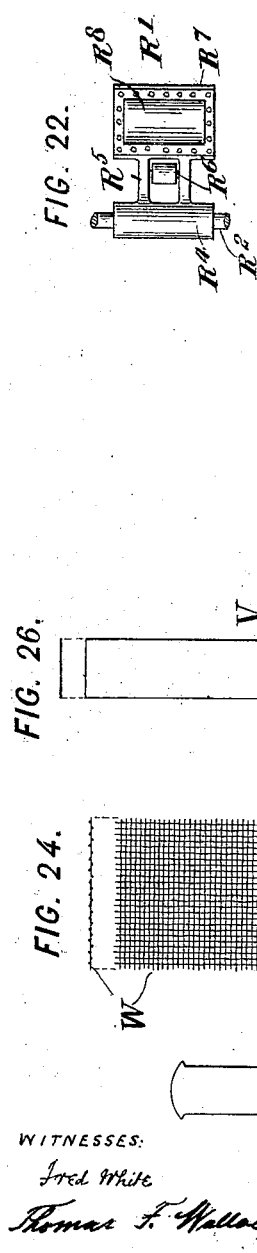

UNITED STATES PATENT OFFICE.

WILLIAM H. MARVIN AND ROBERT R. VESSEY, OF NEW YORK, N. Y., ASSIGNORS TO FRED WHITE, OF NEW YORK, N. Y.

MACHINE FOR MANUFACTURING BOOKS.

No. 848,563.      Specification of Letters Patent.      Patented March 26, 1907.

Application filed May 5, 1898. Serial No. 679,797.

*To all whom it may concern:*

Be it known that we, WILLIAM H. MARVIN and ROBERT R. VESSEY, both citizens of the United States and both residents of the borough of Brooklyn, in the county of Kings and city and State of New York, have jointly invented certain new and useful Improvements in Machines for Manufacturing Books, of which the following is a specification.

This invention relates to machines for successively performing a number of consecutive operations incident to the making of books and aims to provide an improved mechanism especially applicable to lining-up and head-banding the backs of books, but also capable of adaptation for other steps in bookbinding.

Various machines have heretofore been employed for binding books—such, for example, as the Crawley rounding and backing machines and the Lovell and Bredenberg and Arnold bookbinding-machines. In these it has been customary to clamp the signatures composing the book and carry them to successive positions, at each of which some operation incident to binding the book has been performed, after which the book is discharged either as a wholly or partly completed book, according to the machine or machines with which it has been acted on and the operation or operations to which it has been subjected. Many machines simply round and back the book, discharging it as a stitched coverless book ready for the "lining-up" process preliminary to the application of the cover to the book. The "lining-up" is the term commonly employed to designate the gluing onto the back of a stitched, rounded, and backed book of first a "super" and then a "lining" paper if the book is to have no "head-band," or, if a head-band is to be used, second the head-band, and then the lining-paper. The super is usually a sheet of netting or textile material of less length than the height of the book and of greater width than the width of the back or the thickness of the book. It is gummed at its middle to the middle of the back of the book, its sides being left as projecting flaps to be glued to the inner face of the cover for connecting the book and cover together. The lining is usually a piece of paper of like dimensions with the back of the book and pasted thereon over the super to stiffen the book and insure its keeping in shape. The head-band is a narrow strip of ornamental ribbon pasted on the edge of the back, with its edge projecting slightly beyond the latter to give an ornamental and finished appearance. These parts are still usually applied to the book by hand, and much care is required for correctly applying them. The operations requisite to applying them are, first, the thorough gumming of the back of the book, then the application of the super thereto, then an application of gum over the back and the part of the super adhering thereto, and then the location of the lining on the back and subjecting it to suitable pressure to firmly adhere it thereto throughout its length. The convexity of the back for a rounded book has added to the difficulty of locating and adhering the super and lining, and the operations have been slow and tedious of performance.

Our invention aims to provide improved mechanism by which these or other operations of bookbinding can be automatically performed mechanically with relatively great speed and with exactness and uniformity.

To this end in carrying out the preferred form of our present invention as applied to a machine for lining up books we provide a series of book-clamps having an endwise movement, tracks for these clamps, and a plurality of revolving clamp-carriers having an intermittent rotary movement on an axis parallel to the tracks, which carriers successively receive the clamped books and present them to mechanism adapted to perform successive operations on the books, the clamps being shifted from one carrier to another to bring them into position for successive operations and being fed from the book-receiving to the book-discharging position automatically in their transit of the machine. Any convenient number of clamps may be used, forty-eight being shown in the drawings as an example. The tracks are preferably composed of revolving and stationary portions, the revolving portions being formed on the periphery of the revolving carriers, which latter for this purpose are preferably formed as hollow drums or skeleton cylinders and the stationary portion being between and connecting two opposite tracks of the moving portion. The drums preferably consist of two large end drums and a smaller intermediate drum set eccentrically of the end drums with its periphery coinciding therewith at one point and sufficiently inwardly thereof at the diametrically opposite point to make room for the stationary track at this point. The clamps are fed from one end drum to the track and from the latter to the other end drum, from which they are fed to the small drum and back to the large drum again, traveling in their transit of the machine an endless path of approximately spiral form. During the revolution of the drums the mechanism operating on the books is inactive, and during the rests these mechanisms perform their functions, and the longitudinal feeding mechanism feeds the clamps longitudinally of the tracks. At the same time the feeding and discharge takes place.

The invention provides improved mechanism for successively gumming, supering, gumming and lining a rounded and backed book, and it also provides improved pressing and rubbing mechanism for insuring complete adhesion of the super and lining paper to the book, provides rests during which the gum applied can sufficiently dry and set, and provides various other features of improvement, all of which will be hereinafter fully set forth with reference to the accompanying drawings.

Figure 2:
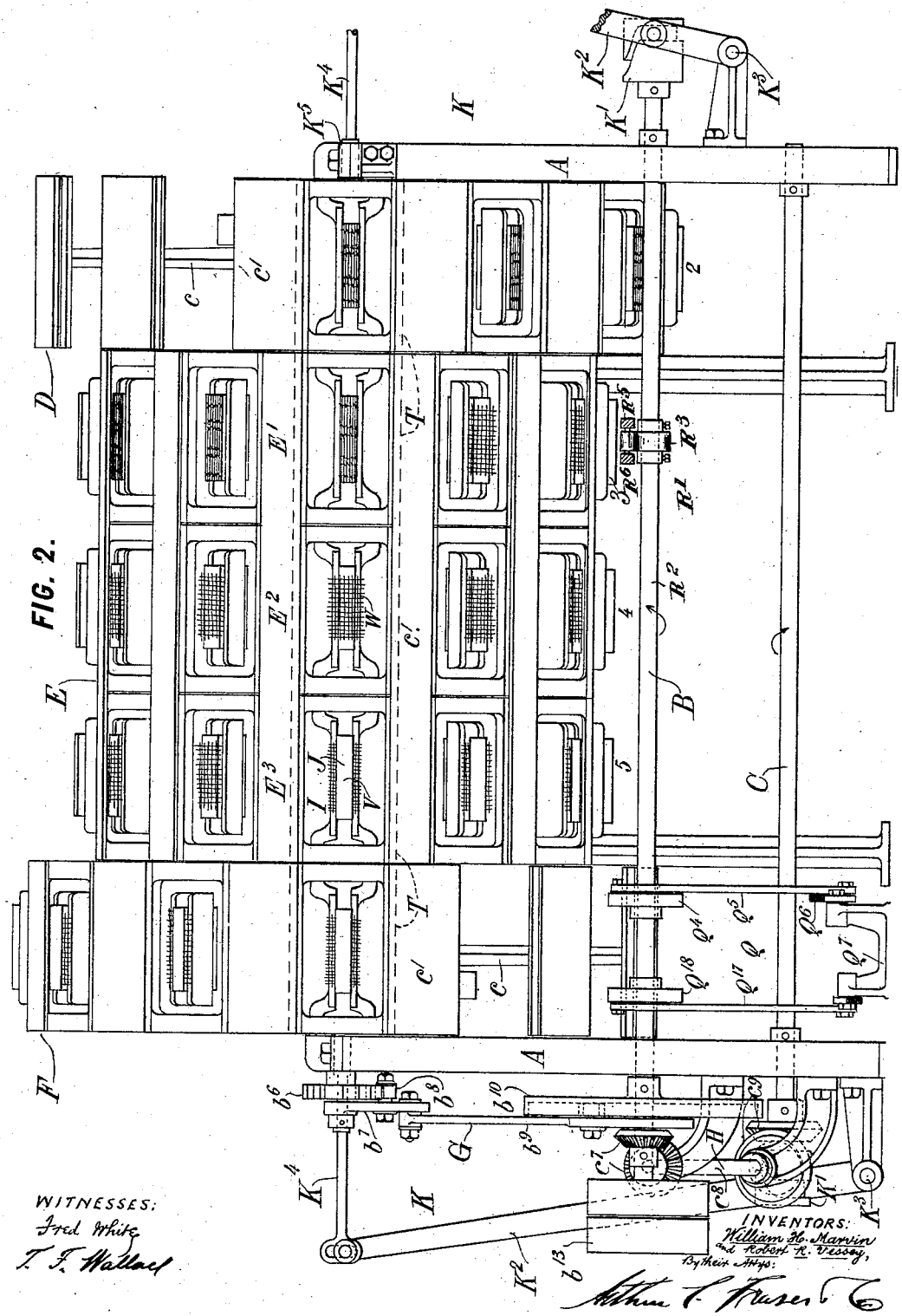
Figure 3:
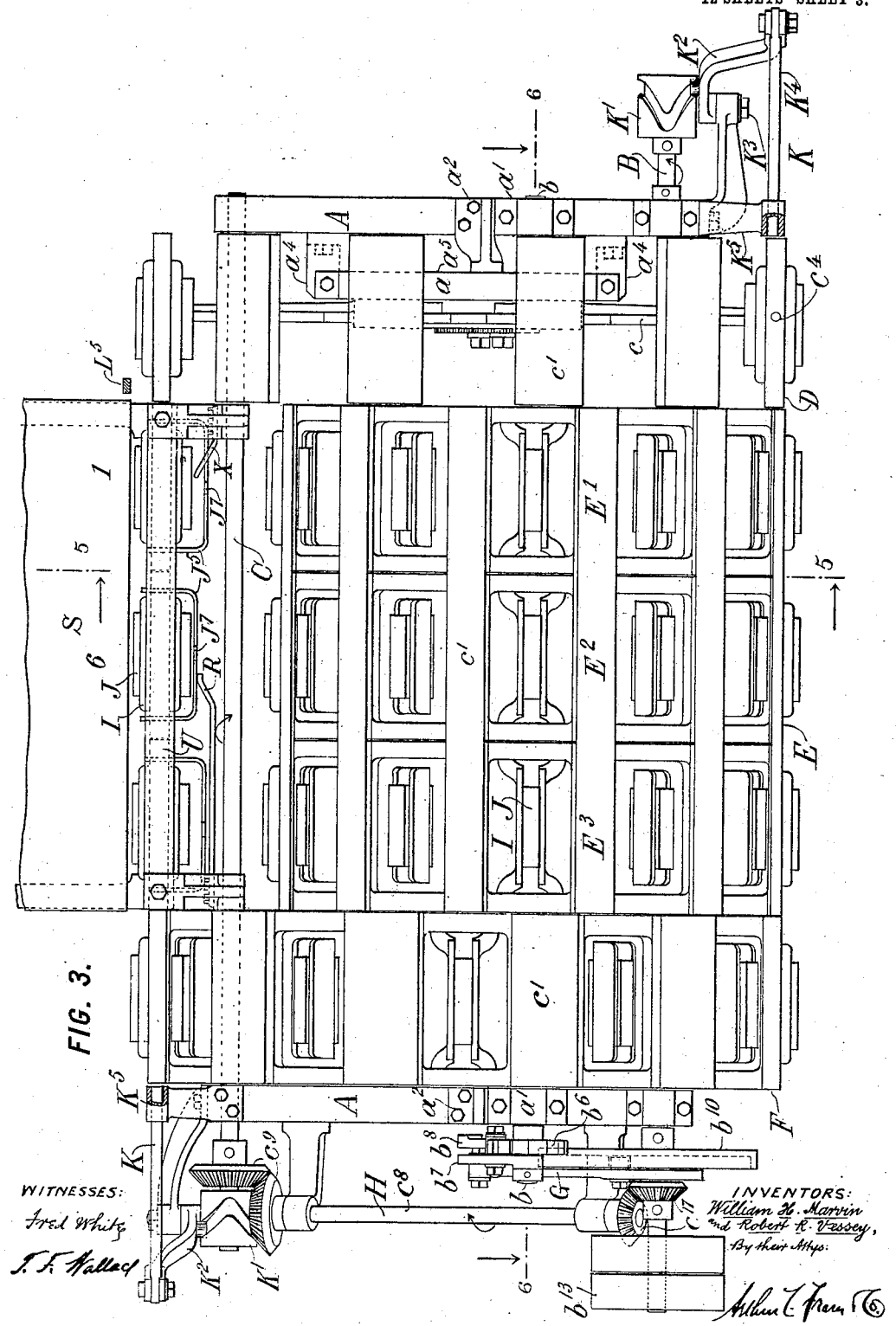
Figure 4:
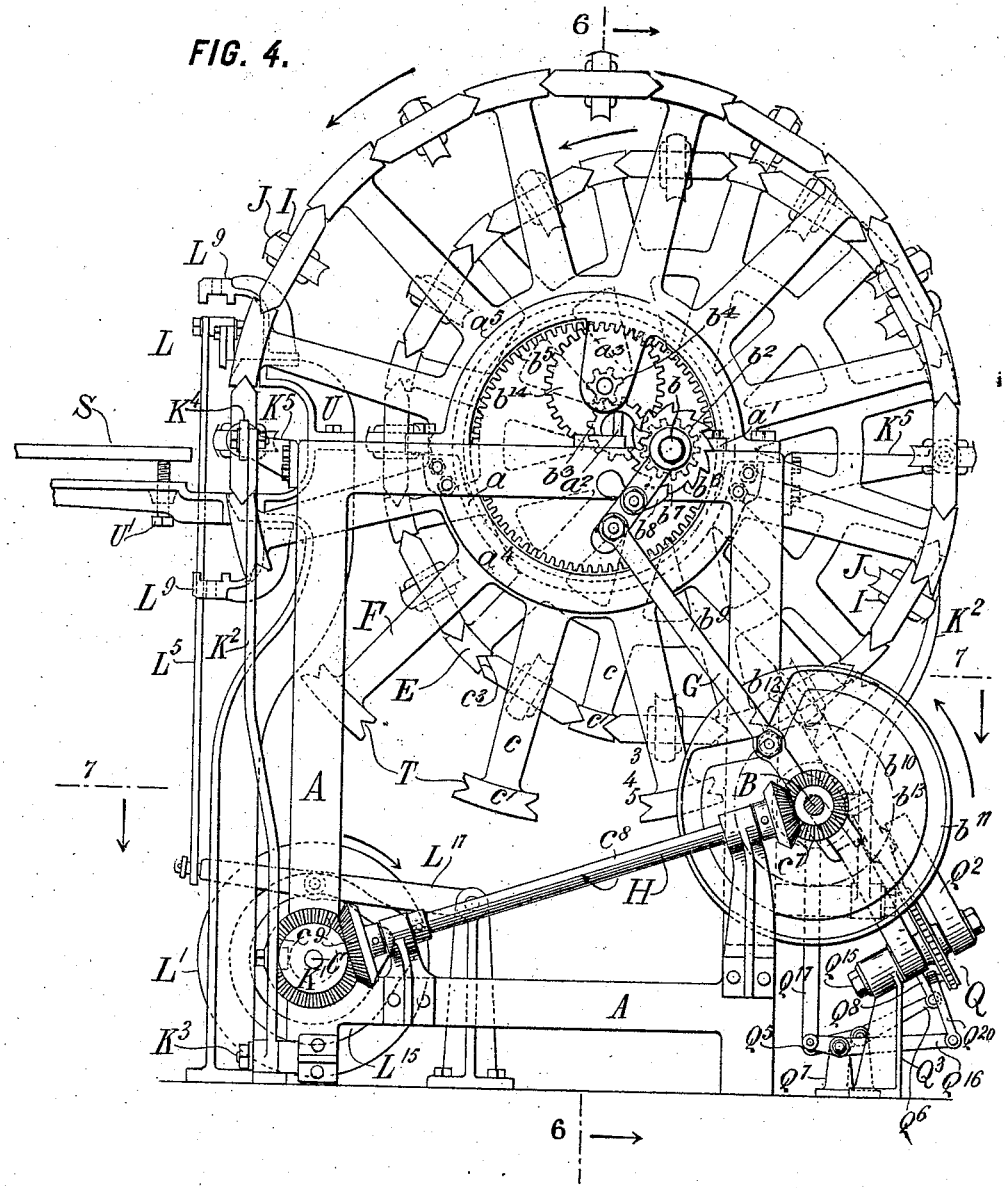
Figure 5:
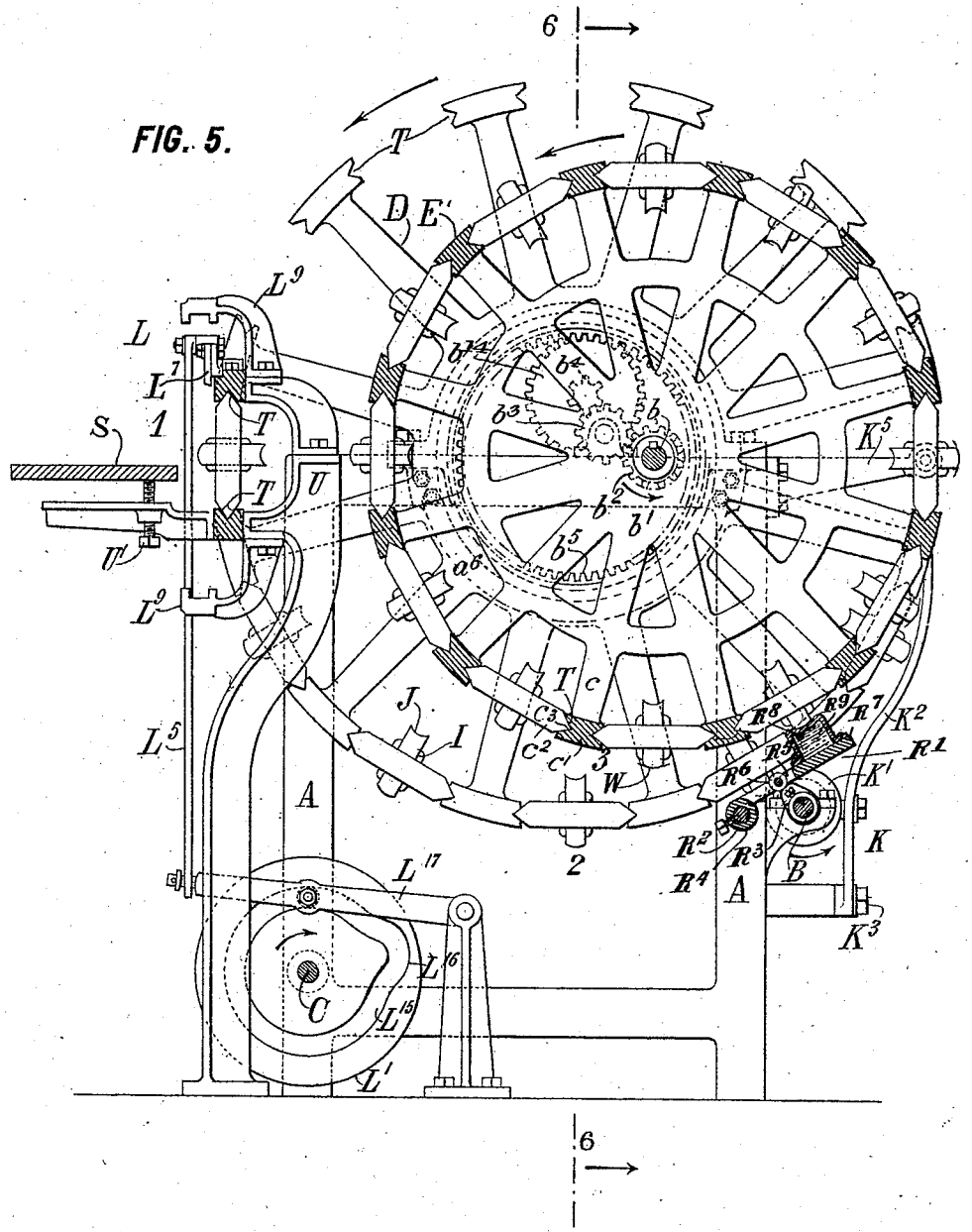
Figure 6:
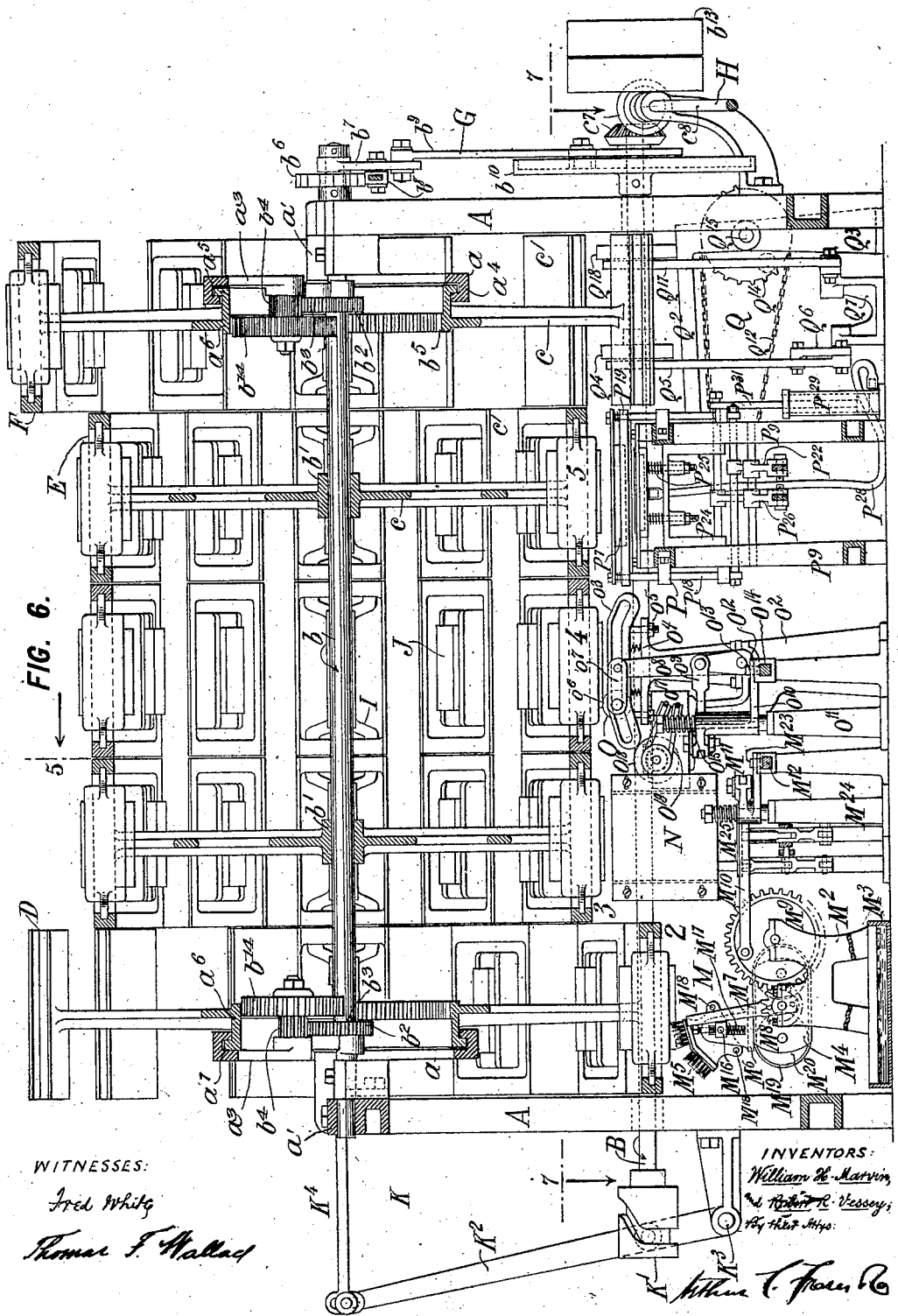

Figure 1 is a fragmentary front elevation of a machine constructed according to the preferred form of our invention. Fig. 2 is a fragmentary rear elevation thereof. Fig. 3 is a fragmentary plan view thereof. Fig. 4 is a fragmentary end elevation thereof. Fig. 5 is a fragmentary transverse section thereof cut on the lines 5 5 in Figs. 1 and 3 and looking in the direction of the arrow. Fig. 6 is a vertical longitudinal section thereof cut on the line 6 6 in Figs. 3, 4, and 5 and looking in the direction of the arrow. Fig. 7 is a fragmentary horizontal section thereof cut approximately on the line 7 7 of Figs. 1, 4, and 6 and showing the bottom mechanism in plan. Fig. 8 is a face view of the cam for operating the first gluer. Fig. 9 is an enlarged fragmentary vertical cross-section of one of the book-carrying clamps, taken through the axis of the clamping mechanism, which latter is also shown in section, the view being cut on the line 9 9 in Fig. 10. Fig. 10 is a fragmentary front elevation thereof. Fig. 11 is a fragmentary section of the clamp alone in the open position. Fig. 12 is an enlarged fragmentary vertical section showing the super-applying mechanism. Fig. 13 is a fragmentary plan view thereof. Fig. 14 is a fragmentary plan view of the super-carrier. Fig. 15 is an end view thereof. Fig. 16 is a front elevation thereof, showing the mechanism in section on the line 16 16 in Fig. 12. Fig. 17 is an enlarged side elevation, partly in vertical section, of the lining-applier, showing it in the feeding position. Fig. 18 is a fragmentary side elevation thereof, showing it in the applying position. Fig. 19 is an enlarged fragmentary side elevation, partly in section, of the lining-presser. Fig. 20 is an end elevation thereof, and Fig. 21 is an elevation of the lifting-cam therefor. Fig. 22 is a detail view; and Figs. 23, 24, 25, 26, and 27 are face and edge views of the book, super, supered book, lining, and lined book, respectively. Fig. 28 is a diagram.

Referring to the drawings, we will now describe in detail the various features of construction, arrangement, and operation embodying the preferred form of our invention as therein shown.

The machine comprises in general a suitable frame A, a driving-shaft B, a cam-shaft C, a plurality of revolving clamp-carriers or drums D, E, and F, gearing G, intermittently operating the carriers, gearing H, continuously operating the cam-shaft, a plurality of clamps I for carrying the books J, clamp-feeders K for moving the clamps, closers L for closing the clamps on the books, a primary gummer M for applying the first adhesive to the books, a super-applier N for attaching supers to the books, a second gummer O for applying adhesive to the supers, a lining mechanism P for applying lining-paper thereto, pressing mechanism Q for affixing the lining, a releaser R for opening the clamps, and a feed-table S at the discharging and receiving point of the machine. The clamp-carriers have like longitudinal tracks T, coinciding at one or more points, through which tracks the clamps I are fed endwise from the feeding position to the successive positions for first gluing, receiving the super, second gluing, receiving the lining, and discharging, all of which positions are at different points longitudinally of the machine.

The books are placed in the clamps from the table S at the position 1, which table is opposite a stand or support U, having tracks T for the clamps intervening between the carriers D and F and coinciding with the tracks thereof. This support U holds the clamps during the feeding and discharging of books to and from them. While in the position 1 the clamps are closed on the book by the closing apparatus L, after which they are moved to the carrier D, by which they are carried down to the position 2, where they are held stationary during the operation of the gummer M, which applies gum to the back of the book. The clamp is then carried by the carrier D to the point where the tracks carrying it are in coincidence with the tracks of the carrier E, and when both carriers are at rest the adjacent feeder K pushes the clamp from the tracks of the carrier D into those of the carrier E. This carrier is of a length as many times greater than the length of the clamp as there are operations to be performed on the book while it is in this carrier. The carrier E shown is adapted for holding the book during three operations on it, and therefore has three longitudinal portions $E'$ $E^2$ $E^3$, in which the clamps successively rest. A clamp is first fed to the portion $E'$ from the carrier D and is then carried upwardly and around with the revolution of the gear until it reaches position 3, where during the rest of the carrier a super W is applied to the now sufficiently-dried glued back of the book, this being done by the applier N. The clamp is then carried up to the rear feeding position and is again fed along until it reaches the part $E^2$ of the carrier E, by which it is carried around to position 4, where the second gummer O applies gum to the back of the super. The clamp is then carried up to the rear feeding position and is fed to the part $E^3$, by which it is carried up and around to the position 5, where a lining-paper V is applied to the glued back of the super by the liner P. During the next rest of the carrier E or at any subsequent movement of the book this liner is pressed home by a suitable presser, as Q. The carrier E raises the book to the rear feeding position, where it is fed from the carrier E into the tracks of the carrier F, by which it is carried up and around to the front feeding position, where the tracks of this carrier come in coincidence with those of the support U, whereupon the clamp is fed from the carrier to the latter and along it until it reaches the discharge position 6, in moving to which the clamp is released by the releaser R, so that the book can be removed. An auxiliary closer X is located at the feeding position 1, so that closing of the clamp shall be insured before it passes from the holder to the first carrier.

The book is fed to the machine properly rounded and backed and ready for the lining-up operation and is discharged properly lined. It is firmly held by the clamp during the time between feeding and discharging and intermittently traverses in its transit of the machine a plurality of circular paths, in traversing which between operations opportunity for sufficient drying of the adhesive is afforded.

The structural details of the features for carrying out the various movements and operations incident to our invention, can be such as circumstances or choice dictate; but we prefer the particular constructions shown which embody in themselves features of improvement incident to the invention.

The carriers have an intermittent or step-by-step revolution. The carriers D and F are concentric and of large diameter, and the carrier E is eccentric thereto and of sufficiently smaller diameter to provide room for the support U between the carriers D and F and in front of the carrier E, so that the books held by the latter can pass the support without interference and the clamps can traverse between the carriers D and F. The carriers are preferably mounted on horizontal axes on the same horizontal plane and are driven at relative rotative speeds proportioned to the number of tracks in each. The carriers shown each have twelve tracks and are consequently each moved one-twelfth of a revolution at each step. They are so proportioned that at one point their peripheral tracks coincide, this point being shown as at the rear of the machine, so that the clamps can be fed from one carrier to the next. If the carriers have not the same number of tracks, each should be rotated with such peripheral speed that their successive tracks aline or coincide at such point.

The frame A has bearings $a$ for the carriers D and F, $a'$ for the shaft $b$ of the carrier E, and $a^2$ $a^3$ for the gearing between the carrier. The bearing $a$ is shown as a hollow grooved flange consisting of a semicircular lower part $a^4$, bolted to the frame and having an internal groove, and a similar upper part $a^5$, bolted to the lower part, these being provided at each end of the machine. The carriers D and F are shown as having tubular hubs $a^6$, having outturned flanges $a^7$, fitting the grooves in the parts $a^4$ $a^5$ and thereby rotatively supporting the carriers from the frame. The shaft $b$ is rotatively mounted in the bearing $a'$ at its ends and passes through the hollow hubs of the carriers D and F, between which it has the hubs $b'$ of the carrier E keyed to it. Near its ends the shaft $b$ has pinions $b^2$, which mesh with idlers $b^3$ $b^4$, a large pinion $b^{14}$ being carried on the same shaft as idler $b^4$ and meshing with an internal spur-gear $b^5$ on the adjacent hub $a^6$ of the carriers D and F, whereby these carriers are driven from the shaft, the proportions of the intervening gears being suited to the relative rotative speed desired between the adjacent carriers, the proportions shown being suited to secure an equal degree of rotation—one-twelfth of a revolution for all the carriers.

On its end the shaft $b$ carries a ratchet-wheel $b^6$ and a swinging arm $b^7$, carrying a pawl $b^8$, engaging the ratchet and turning it one tooth with each movement of the arm. The arm is connected by a rod $b^9$ with a grooved cam $b^{10}$ on the driving-shaft B, which cam has a long rest $b^{11}$ and a short rise $b^{12}$, the latter serving to operate the ratchet during the portion of the revolution of the driving-shaft which is to be utilized for moving the carriers, while the rest avoids operation of the ratchet during the balance of such revolution, during which time the other operations to be performed by the machine can take place.

Each of the carriers is essentially a wheel or drum the periphery of which is cut away to make room for the tracks T and the movement of the books and clamps longitudinally. Each drum is shown as consisting of a single metal casting having spokes $c$, ending in heads $c'$, in which the tracks T are formed as V-shaped or other grooves. The clamps are shown as having rectangular frames $c^2$, having V-shaped edges $c^3$ fitting the tracks T and adapted to slide longitudinally thereon. To hold the clamps in their respective longitudinal positions in the tracks, any suitable means may be employed—as, for example, the beveled spring-catches $c^4$, which are mounted in sockets $c^5$ in the tracks and snap into V-shaped notches $c^6$ in the clamps, as best seen in Figs. 9 and 10. These catches are provided throughout the tracks of the carriers and of the support U and are located at the proper positions to engage and hold the clamps at proper points. They should yield to the push of the feeders K, but should resist accidental displacement of the clamps. For clearness the catches are omitted from the various views other than Figs. 3, 9, and 10.

The cam-shaft C is continuously driven from the driving-shaft B by the gearing H, which consists of bevel-gears $c^7$ on the shaft B and on a downwardly-inclining counter-shaft $c^8$ and bevel-gears $c^9$ on this counter-shaft and on the cam-shaft, preferably proportioned to drive both shafts at the same speed. The bevel-gears $c^7$ are outwardly of the cam $b^{10}$ and between this cam and the belt-pulleys $b^{13}$. On its end the shaft C carries a feed-cam K' for the front feeder, a similar cam being carried on the other end of the shaft B for the rear feeder K. (See Figs. 1 to 5.) These cams are drum-cams engaging the levers $K^2$ near their fulcrums $K^3$, so that the throw of the cams is multiplied as transmitted to the feed-rods $K^4$ to give the full stroke necessary for moving the clamps the proper distance. The rods $K^4$ are preferably straight rods, the ends of which act directly against the ends of the clamps which are adjacent thereto. The clamp which is directly operated upon by the feeder pushes those in front of it a distance equal to the length of a clamp. After each operation the feed-rod $K^4$ retires, and the succeeding clamp is moved into place by the drum D or F. Rods $K^4$ move through slides $K^5$, and when retracted the ends of the rods assume positions within the slides, as shown in Fig. 3. The throw of the cams K' is suitably adjusted to effect the feed of the clamps at the proper time and while the carriers and other parts are in proper position.

The cam-shaft C carries a closer-cam L' for operating the closer L, a gummer-cam M' for operating the first gummer M, and super cams N' N² for operating the applier N, a second gummer-cam O' for operating the second gummer O, and lining-cams P', P², and P³ for the liner P.

The books are fed to the clamps from the table S, which is shown as an adjustable table carried from the frame of the support U by screws U'. The clamps preferably consist of two plates I', movable against the sides of the book and carried from the frame $c^2$ by wings $I^2$, sliding in tracks $I^3$ in the ends of the frames, which tracks serve as guides for the plates I'. The plates are retracted or opened by springs $I^4$ and are caused to open equal distances from the medial or central horizontal line of the frame by links $I^5$, which are jointed together by a pin $I^6$, playing in a slot $I^7$. The plates are fastened in their closed position against the sides of the book by cams J', which are snail-cams or eccentrics fulcrumed at $J^2$ to the ends of the frames and wedging their edges against the wings $I^2$ to frictionally lock the latter in the tracks when in one position and freeing these wings when in the released position. These locks J' are caused to move together by a toggle $J^3$, the links of which are pivoted at their outer ends to the cams at $J^4$ and together at their inner ends to the slide $J^5$. When the toggle is straightened, it forces the cams to the locked position and as the toggle passes the dead-center prevents unlocking of the cams, which thus hold the plates stationary until the toggle is broken. The slide $J^5$ is preferably a U-shaped bar, the ends of which slide in transverse grooves $J^6$ in the frame $c^2$ and the middle of which uniting the ends extends from end to end of the clamp at rear of the books and has upward and downward projections $J^7$ and $J^8$ near its center, by which it can be operated to throw the toggle $J^3$ to the closed or open position. As shown, a releaser R, consisting of a projecting finger in the path of the projection $J^8$, serves to throw the slide inwardly to release the clamps as the clamps move to the position 6 shown in Fig. 3, and a closer X, consisting of a plate standing in the path of the projection $J^7$ when the slides are in the unlocked position, serves to draw the slides to the locked position as the clamps move from the position 1 in Fig. 3. The slot $I^7$ is for convenience formed in the slide $J^5$, but is of such length that there is no interference with the movement of the slide, which is always the same, while the extent of closing of the plates varies with the thickness of the book to be clamped.

To provide for automatically clamping books of varying thickness, this invention comprises a compensating closing apparatus in the construction described for the clamp and the means for automatically setting the plates against the book, which will now be described as the "closer" L. In the form shown this comprises two yielding closers $L^2$, moving toward and from the plates I' to seat the latter against a book with the desired force, after which they yield and permit further movement toward the book of their carriers L³, which carriers are driven in any suitable manner from the cam L', as by the toggle L⁴, through the medium of a connecting-rod L⁵, bell-cranks L⁶, and connecting-rods L⁷. The bell-cranks are mounted on brackets L⁸ on the tracks T of the support U. The toggles are carried by brackets L⁹, projecting from the support U, and at their inner ends are connected rigidly but adjustably to the carriers L³ by screws L¹⁰ passing through blocks L¹¹, to which the toggles are jointed, and rotatively engaging the carriers L³ and loosely passing through large holes L¹² in the brackets L⁹. The closers L² are connected to the carriers L³ by loose bolts L¹³, carrying springs L¹⁴, the yield of which determines the force with which the plates I' are pressed against the books. When the pressers move the plates against the books, the carriers L³ move with the pressers until the resistance of the springs is overcome, whereupon the pressers remain stationary and the carriers continue their movement toward the books. In this continued movement the carriers operate the cams J' to lock the clamps. Adjustable screws $d$ in the ends of the carriers L³, striking noses $d'$ on the cams, are shown for swinging the latter. These screws swing the cams forcibly to the locked position as the carriers move after the pressers, the adjustment being such that at the completion of the predetermined movement of the carriers the cam will be set so tight against the wings I² that they will prevent opening movement of the plates. In thus moving the cams the toggle J³ is straightened, thus throwing the slide J⁵ to the locked position. As soon as the movement of the carriers L³ is completed they are returned by the toggles L⁴ to their upward position, drawing the closers L² away from the plates and freeing the clamps, which are now held closed by the straightened toggle J³, preventing unlocking of the cams J'. The closers L open sufficiently to clear the noses $d'$ of the cams J'. Should the slide J⁵ not be sufficiently retracted or the toggle be not quite to the dead-center, as soon as the cams start to feed from position 1 toward the carrier D the closing-plate X will draw the slide J⁵ to the fully-closed position.

The books are fed to the clamps while the latter are at rest against endwise movement and are automatically clamped during such period and at any suitable part of the revolution of the cam-shaft C. For this purpose the closer-cam L' is suitably constructed, that shown being a grooved cam having a long rest L¹⁵, during which the closer is inactive, and a sharp rise and fall, during which the rod L⁵ is raised or lowered for throwing the closer toward and from the active position. A lever L¹⁷, having a cam-roller, is preferably employed for transmitting the motion from the cam to the rod. Whatever the thickness of the book, the plates I' will be closed on it, and the cams J' will lock them in their closed position, the links I⁵ insuring that the book shall be disposed midway between the top and bottom of the clamp. Thus the adjustment for clamping the books is entirely automatic.

The primary gummer M, which is the first device to which the book is presented after entering the carriers, comprises several features of improvement which will now be described in detail, referring particularly to Figs. 6 and 7. This gummer is designed to apply adhesive to the back of the book throughout the length thereof without applying any to the ends. For this purpose the gummer strikes the book near its middle and wipes gum from this point outwardly to the end and then makes a return stroke, again striking the book near the middle and wiping gum thereon outwardly to the other end, after which the gummer passes to the gum-box and takes up a fresh supply of adhesive for the following operation. The gummer acts on the book while the latter and its carrier are at rest and is operated by the cam-shaft C, which carries the cam M' for this purpose. As shown, the gummer M comprises a frame M², a gum-box M³, a track M⁴, a brush M⁵, and carriage M⁶ therefor sliding on the track, and shifter M⁷, a pinion M⁸, and a spur-gear M⁹. The spur-gear drives the shifter and is itself driven by a connecting-rod M¹⁰, bell-crank M¹¹, and connecting-rod M¹² from the cam M', which cam is a grooved cam adapted to oscillate the spur-gear in such manner that the shifter shall throw the brush down into the gum-box and back and forth therein and then up to the book and preferably twice back and forth thereagainst. For this purpose the cam-groove has a rest M¹³, at which the brush is between its upper and lower positions, rises and falls M¹⁴, which throw the brush back and forth along the book, and rises and falls M¹⁵, which swing the brush back and forth in the gum-box. A slight movement at the cam serves to provide sufficient movement for the brush by reason of the difference in size between the pinion and spur-gear, the extreme oscillation required for the pinion being about two-thirds of a revolution. The carriage M⁶ is shown as yieldingly swiveled to the middle of the brush-body by a pivotal block M¹⁶, which slides in a slot M¹⁷, being held outwardly by a spring and checked in its outer movement by a screw-stop, so that the brush can yield to an unduly-projecting book and can be adjusted in its outward position. The brush proper is divided at its middle and consists of two relatively oblique sets of bristles, one of which acts with its advancing edge during one movement of the brush and the other of which acts with its advancing edge during the other movement. The brush is tilted to cause its advancing edges to act, this being preferably done by means of projecting pins or studs $M^{18}$ on the brush, between which the shifter $M^7$ loosely plays, so that the movement of the shifter against one of these projections will tilt the brush-body until the other projection strikes the carriage $M^6$, whereupon continued movement of the shifter will draw the brush and carriage to the end of its stroke, after which as the stroke of the shifter reverses there will be lost motion until it strikes the other projection, whereupon it will first tilt the brush in the opposite direction and will then draw it back with its advancing edge against the book. The carriage is preferably mounted on a belt $M^{19}$, which runs over pulleys $M^{20}$, mounted in the track $M^4$, which facilitates movement of the brush and reduces friction.

To disconnect the gummer M, a suitable disengaging device is provided. We prefer to use a treadle $M^{21}$, the inner end of which lifts the bell-crank $M^{11}$ upwardly until its slot $M^{22}$ is free from the pin $M^{23}$ on the slide $M^{12}$, whereupon the gummer will cease to participate in the movement of the slide. The bell-crank is shown as vertically movable on a post $M^{24}$ and is forced downwardly by a spring $M^{25}$.

The next device acting on the book is the super-applier N. This is operated from the cam-shaft C by means of pinion-cams $N'$ and $N^2$, formed in opposite faces of the same disk, and is best constructed as a hopper or box, in which a pile of properly-cut super-cloths are placed, the pile being lifted until the uppermost super is pressed against the glued back of the book, where it is left as the pile falls. Our invention provides a device for this purpose comprising various features of improvement. In its preferred form the super-applier comprises a box consisting of side walls $N^3$, fixed to posts $N^4$ and connected adjustably to end pieces $N^5$, carrying adjustable side gages $N^6$, between which pieces and gages the supers are carried by a bottom $N^7$, the box being movably vertically and being for this purpose carried in slideways $N^8$, into which its posts $N^4$ fit. The bottom $N^7$ rises with the walls of the box until the top edges of the walls is close to the back of the book when the latter stands in position 3. Then the box remains stationary and the bottom rises a sufficient distance to force the uppermost super against the back of the book, whereupon the bottom falls to its normal position in the box and the whole box falls to its inactive position. As the depth of the pile of supers diminishes the bottom rises within the box to maintain the top of the pile near the top of the box. The construction shown for accomplishing this consists of a number of notches $N^9$ on the posts $N^4$ and a number of catches $N^{10}$ on the bottom adapted to engage the notches as the bottom rises within the box, so that the bottom must rise with the box by reason of engagement between the catches and notches and can rise independently of the box and can rise for a distance less than the height of a notch and can fall back to its previous position; but when rising the full height of a notch its catches will engage in the next notch, and thus change its normal position within the box. The box is raised by toggles $N^{11}$, engaging at their ends posts $N^4$ and the slideways $N^8$ and connected at their knuckles by links $N^{12}$ with a connecting-rod $N^{13}$, operated by the cam $N'$, a cross-bar $N^{14}$ connecting the links to the rod. The cam $N'$ has a long rest $N^{15}$ and a rise $N^{16}$, the rise being sufficient to lift the box a predetermined distance once each revolution of the cam. Thus the box will have a periodical uniform movement and during this movement it will carry the bottom $N^7$ with it. To give the independent movement to the bottom, another toggle $N^{17}$ is provided, which is connected at one end to a slideway $N^{18}$ and at its other end to a lifting bottom $N^{19}$, movably connected by bolts $N^{20}$ to the bottom $N^7$, from which it is held at some distance and yieldingly by springs $N^{21}$, which springs are sufficient in tension to raise the bottom $N^7$ with the lifter $N^{19}$ with sufficient force to properly press a super against the back of a book and to yield to a greater force, so that the full movement of the lifter $N^{19}$ can take place. This lifter has a regular movement imparted to it by the toggle $N^{17}$, which is operated by a connecting-rod $N^{22}$, driven by the cam $N^2$, which cam has a rest $N^{15}$ and a rise $N^{16}$ corresponding with those before described and also an additional rise $N^{23}$, which latter serves to elevate the lifter $N^{19}$ after the upward movement of the box ceases. The toggles $N^{17}$ and $N^{11}$ are of like proportions and arrangement, so that they work together during the action of the coinciding portions of the cams $N'$ $N^2$. The lifting bottom $N^{19}$ is elevated with the bottom $N^7$ as the catches of the latter engage the successive notches, and to preserve a corresponding adjustment between it and its toggle the bottom is provided with like notches $N^{24}$ on its downwardly-guiding projection $N^{25}$, which notches are opposed to the point $N^{26}$ of the toggle $N^{17}$ and are successively engaged thereby, so that as the bottoms rise this toggle maintains a substantially uniform relation to the lifting bottom $N^{19}$. All the toggles move together until the rise $N^{23}$ acts on the toggle $N^{17}$, when the latter lifts the supers a little above the box. This lifting raises the catches in their notches as the supers are removed until the catches engage the next notch, which holds the bottom $N^7$ against falling, so that the heads of the bolts or stops $N^{20}$ check the fall of the bottom $N^{19}$ at a point one notch higher than before as this bottom falls. The continued buckling of the toggle $N^{17}$ draws its point $N^{26}$ downwardly until this point catches the notch below that which it previously engaged. This operation is continued until the pile of supers is exhausted, whereupon the catches $N^{10}$ and the toggle-point $N^{26}$ are disengaged from the notches and the bottom $N^7$ and bottom-carrier $N^{19}$ are restored to their lower positions, in which a new pile of supers is placed in the box.

It will be understood that the box rises and falls alternately at each operation and that the bottom is lifted with the box to the upward limit of movement of the box, whereupon the rise $N^{23}$ of the cam $N^2$ becomes active and lifts the bottom slightly above the point to which it was carried by the box, its upward movement being limited by the book-back and the catches $N^{10}$, sliding idly on one of the notches $N^9$. At each operation one of the supers is removed, and when enough have been removed to diminish the pile a distance approximately equal to the length of a notch the catches $N^{10}$ pass upward and engage the next succeeding notch.

The yielding nature of the supers and the pressure with which they are applied to the books suffices to properly adhere them; but, if desired, they may be subsequently further or more fully pressed against the backs of the books in any usual or suitable manner.

After the supers have made a circuit of the carrier E, during which their gum is sufficiently dried, they are, if a lining is to be applied, again coated with adhesive, which is done by the second gummer O, operated by the cam $O'$. This gummer comprises a frame $O^2$, on which is yieldingly and adjustably held a track $O^3$, supported by springs $O^4$ and adjustably limited in its upward movement by bolts $O^5$, which track has a horizontal portion opposite the book and depressed ends beyond the latter and guides a reciprocating roller $O^6$, which is oscillated by a link $O^7$, connected to a lever $O^8$, fulcrumed to the post $O^2$ and connected by a link $O^9$ with a bell-crank $O^{10}$, mounted on a post $O^{11}$ and having a slot $O^{12}$, engaging the pin $O^{13}$ of a sliding rod $O^{14}$, which is reciprocated by the cam $O'$. The bell-crank is held down on the post $O^{11}$ by a spring $O^{15}$, against which it can be lifted by a treadle $O^{16}$ to disengage its slot $O^{12}$ from the pin $O^{13}$ and throw the gummer out of action. A gum-box $O^{17}$ is shown in which is a roller $O^{18}$, revolved by a belt $O^{19}$, driven by a pulley $O^{20}$ on the cam-shaft. The gum-roller $O^6$ at the end of its stroke at the left rests against the roller $O^{18}$ and is gummed thereby. The cam $O'$ leaves the gum-roller $O^6$ in contact with the roller $O^{18}$ except during the period of gumming, which is while the book is at rest at the position 4, during which time the cam carries the roller $O^6$ across the book from end to end and back to its position of rest. The track yields to an unusually-projecting book. The depressions at the end of the track prevent application of gum to the end edges of the book. The gum here applied is placed on the back of the super, which the book now carries, covering that portion of the back to which the lining is to be pasted.

From the second gummer the book makes a circuit of the carrier E and is brought to rest at position 5, where the lining is to be applied. The liner, as shown in Figs. 1, 6, 7, 17, and 18, comprises a roll of paper $P^4$, trimming-knives $P^5$, feed-rolls $P^6$, a cutter $P^7$, a presser $P^8$, and mechanism for operating these parts mounted on a frame $P^9$. The feed-rolls are driven from the cam $P^3$ by means of a rod $P^{10}$, retracted by a spring $P^{11}$ and adjustably connected to a slot in an arm $P^{12}$, carrying a pawl $P^{13}$, engaging a ratchet $P^{14}$ on a spur-gear $P^{15}$, which drives a pinion $P^{16}$ on one of the feed-rollers. The feed is adjusted to project exactly the width of paper desired for the lining at each throw of the cam. The paper as fed is drawn between the trimming-rollers $P^5$, which clip the edges to the desired length.

The knife $P^7$ works across the edge of a table $P^{17}$ and is fixed to the ends of reciprocating rods $P^{18}$, on which are yieldingly carried a presser-bar $P^{19}$, against which a spring $P^{20}$ acts. The bar clamps the paper with the downward movement of the rods $P^{18}$, and the continued movement of these rods compresses the spring until the rods have moved far enough to carry the knife through the paper, whereupon the parts rise and remain at rest until the next cut is to be made, leaving the paper on the presser $P^8$, on which it is held at the desired point by a gage $P^{21}$, adjustably held to the edge of the presser. The knife is operated through a bell-crank $P^{22}$ and rod $P^{23}$ from the cam $P^2$.

The presser $P^8$ is opposite the point of rest of the book at position 5 and rises with the lining on it until it presses the latter against the back of the book, as shown in Fig. 18. The presser is carried by a rising frame $P^{24}$, sliding in the frame $P^9$ and sustaining the presser yieldingly on a spring $P^{25}$, so that it can yield to books of different projection. The presser is lifted through the medium of a bell-crank $P^{26}$ and rod $P^{27}$ by the cam $P'$. To hold the lining on the presser, the latter is constructed with a hollow body having a perforated top, which body is connected by a pipe $P^{28}$ with a pump $P^{29}$, the piston $P^{30}$ of which is connected by its rod $P^{31}$ with the frame $P^{24}$, so that it rises therewith, thus exhausting the air from the presser until the frame reaches the top of its stroke, when the piston passes an inlet $P^{32}$, which releases the vacuum and allows the lining to remain on the book when the presser descends. To throw out the lining apparatus, the cams $P'$ $P^2$ $P^3$ are mounted on a sleeve $P^{33}$, which is engaged by a clutch $P^{34}$, splined to the shaft C and thrown into and out of active position by a treadle $P^{35}$.

To press the lining on the back, we employ the presser Q, which acts against the book at its next rest beyond the position 5. This is shown as a pressing-brush $Q'$, carried by a swinging frame $Q^2$, which is fulcrumed on a post $Q^3$ and is swung in an oblique plane radially of the carrier toward and from the carrier E by a cam $Q^4$, through the medium of a rod $Q^5$ and lever $Q^6$, fulcrumed to a bracket $Q^7$ and connected to the frame by a link $Q^8$. The cam $Q^4$ throws the brush toward the book, so that the edge of the brush will strike near the middle of the book, and holds it there until the stroke of the brush carries it past the end of the book. Then the brush makes a reverse stroke and the cam drops the brush away from the book, raising it again for the next book. The brush is shown as a divided brush having two sets of bristles obliquely inclined with a space between them. It is carried by a body $Q^9$, which is pivoted at $Q^{10}$ to a sliding block $Q^{11}$ and below its pivotal point is connected to a chain $Q^{12}$, which runs over a sprocket-pinion $Q^{13}$ in the end of the swinging frame and over a sprocket-gear $Q^{14}$, fulcrumed on the pivotal axis $Q^{15}$ of the frame. The sprocket-wheel $Q^{14}$ is oscillated, by means of a pitman $Q^{20}$, lever $Q^{16}$, and rod $Q^{17}$, from the cam $Q^{18}$, which causes the chain to first move in one direction and then in the other direction a sufficient distance to move the brush longitudinally of the book in a plane parallel with the back of the book across and past the end of the book first one way and then the other. When the motion of the chain is reversed at the end of the stroke, it first tilts the brush to the opposite side, thus pressing its edge to the back of the book, which edge strikes the back inwardly of the end and then advances along the back to the other end, which it passes, whereupon the motion of the chain is again reversed, which tilts the brush to the opposite position, so that its other edge is the advancing edge and is against the back of the book, along which it advances until it passes off the end of the book. Then the frame drops and frees the brush from the book. Thus the brush is prevented from catching the edge of the lining and tearing it off the book. Stops $Q^{19}$ may be provided to limit the lost motion of the brush.

From the brush the book passes to the front feeding position, where it is pushed by the front feeder K to the discharge position, where its clamp is released and the book may be removed.

Our invention provides an improved construction which may be employed for pressing home on the back of the book any pasted part applied thereto, having the same purpose as the bearer Q. This improved presser is shown as a yielding flexible presser $R'$, fulcrumed to the frame on a shaft $R^2$, extending rearwardly over the shaft B and swung by a cam $R^3$ on said shaft B toward and from the back of the book in the next position following that on which the super was applied to the book, so that it presses the super thoroughly onto the book as soon as the book is removed one position from the position 3. It is immaterial, however, what the exact position of the presser $R'$ is or which of the pressing operations it performs. The presser is shown as composed of a cast-metal frame having a sleeve $R^4$, receiving the shaft $R^2$, separated arms $R^5$, extending outwardly from the sleeve and carrying between them an antifriction-roller $R^6$, which rides on the cam $R^3$, and carrying at their ends a plate $R^7$, on which is tightly secured the edge of a rubber or other flexible or yielding sheet or piece $R^8$, which bulges upwardly from the plate and forms a closed chamber $R^9$ thereover, which chamber is filled with liquid, gas, or other flexible or yielding or mobile material which can move or yield as the sheet is pressed against the back of the book during the upthrow of the cam, so that the sheet will hug or embrace the curved back of the book, as shown in Fig. 5, and which will restore the sheet to its normal position upon the downthrow of the cam. This presser will adapt itself to any size of book and compensate for any differences in projection. It moves toward the book while the latter is stationary and retires in time to be out of the path of the book when the latter is to be moved. It is best seen in Figs. 2, 5, 7, and 22.

From the foregoing description the operation of the preferred form of our present improvements will be so clearly understood as to render it unnecessary to describe the same any further than to say that the books fed in by the operator to the clamps at position 1 will be automatically clamped and carried successively to the first gummer, then to the super-applier, then to the super-presser $R'$, then to the second gummer, then to the lining-applier, then to the lining-presser $Q'$, and then around to the discharging position 6, at which point as each book is released a fresh one will be supplied to the clamp. Should any operation be imperfectly performed, the gummers and appliers can be thrown out of action until the defective book has passed such mechanism or any one can be thrown out temporarily in order to skip any book.

It will be seen that our invention provides an improved machine which can be readily and advantageously availed of and which while especially applicable to lining up books is also applicable to various other operations incident to book-making. Our improvements insure uniformity in the treatment of the books and overcome the dangers of imperfect lining due to variations in the rounding of the books. With our machine a plurality of operations can be simultaneously performed on as many different books, the books can be quickly shifted from one to another position, the minimum of handling is required, and rapid and effective work is obtained.

One advantage of the improved machine is that all books are exposed to view, so that the operator can see the condition of the work at all times.

It will be understood that our invention is not limited to the particular details of construction, arrangement, combination, and use set forth as constituting the preferred form of our invention, since the invention can be employed in whole or in part according to such modifications of any of these features as circumstances or the judgment of those skilled in the art may dictate without departing from the spirit of the invention.

What we claim is the following defined novel features and combinations, substantially as and for the purpose set forth:

1. In book-making machines, a plurality of clamps, and a plurality of series of tracks carrying such clamps, revolving around parallel axes with an intermittent motion for presenting the clamps at successive positions, and means moving the clamps axially of said tracks from one series to the next.

2. In book-making machines, a plurality of clamps, in combination with a plurality of series of tracks for carrying the clamps, said tracks revolving with an intermittent motion around a predetermined axis, and means for shifting the clamps from one to the next series of tracks.

3. In book-making machines, a plurality of clamps, and a plurality of series of tracks carrying the clamps, said tracks revolving with an intermittent motion around predetermined axes, and those of one series being eccentric of those of the other series.

4. In book-making machines, a plurality of separately-movable clamps movable around a predetermined axis and longitudinally thereof each having means for clamping a book or other article, tracks for such clamps, and means moving the clamps around such axis and longitudinally thereof said clamps each independent of the others.

5. In book-making and other machines, a plurality of clamps, and means carrying said clamps in an endless path and with a step-by-step motion a plurality of times around a predetermined axis, to successive positions longitudinal of the axis, and then in reverse direction to the point of starting.

6. In book-making and other machines, a plurality of clamps, and means carrying said clamps with an intermittent motion throughout an approximately helical path to successive positions longitudinally of a predetermined axis.

7. In book-making and other machines, a plurality of clamps, in combination with a plurality of movable tracks therefor, and a stationary track connecting the extremities of said movable tracks, and means for moving the clamps through the movable and stationary tracks in an endless path.

8. In book-making and other machines, a plurality of revolving carriers eccentrically mounted and having longitudinal tracks alining at one point, in combination with a plurality of clamps carried in said tracks and movable longitudinally thereof, and means for transferring the clamps from the tracks of one carrier to those of another.

9. In book-making and other machines, a plurality of revolving carriers of different diameters and eccentrically mounted the one relatively to the other, having tracks coinciding at one point, in combination with a stationary track alining with the tracks of the larger carrier, a plurality of clamps movable longitudinally through said tracks, and means moving the clamps from the stationary track to and through the tracks of the carriers.

10. In book-making and other machines, three revolving carriers, mounted on parallel axes side by side, the center one of less diameter than and eccentrical to the others, said carriers having longitudinal tracks, alining at one point, a stationary track between the outer carriers, clamps movable through the tracks of the carriers and the stationary track, and means moving the clamps in an endless path throughout such tracks.

11. In book-making and other machines, a revolving drum having longitudinal tracks on its periphery, in combination with a plurality of clamps carried in said tracks, of less length than the drum and movable to successive positions longitudinally thereof, means for revolving the drum, and means for moving the clamps.

12. In book-making and other machines, a plurality of clamps, tracks carrying such clamps, means moving said tracks with an intermittent rotary motion, means moving the clamps longitudinally of the tracks, gumming mechanism opposite one position of the clamps, and super-applying mechanism opposite another position of the clamps.

13. In book-making and other machines, a plurality of clamps, tracks carrying the clamps, means intermittently rotating the tracks, means moving the clamps longitudinally thereof, gumming mechanism opposite one position of the clamps, and mechanism for applying lining-paper opposite another position of the clamps.

14. In book-making machines, a plurality of clamps, tracks carrying the clamps, means revolving the tracks, means moving the clamps axially of the tracks to successive positions, and mechanism for performing successive operations incident to book-making at successive positions of the clamps.

15. In book-making and other machines, a plurality of clamps, tracks carrying the clamps, means revolving the tracks intermittently, means moving the clamps to successive positions longitudinally of the tracks, gumming mechanism, opposite one position of the clamps, super-applying mechanism opposite another position thereof, and pressing mechanism opposite another position of the clamps.

16. In book-making and other machines, a plurality of clamps, tracks carrying the clamps, means intermittently revolving the tracks, means moving the clamps longitudinally of the tracks to successive positions, gumming mechanism opposite one position of the clamps, lining-applying mechanism opposite another position thereof, and pressing mechanism opposite another position thereof.

17. In book-making and other machines, a plurality of clamps, tracks carrying the clamps, means intermittently revolving the tracks, means moving the clamps longitudinally of the tracks, gumming mechanism opposite one position of the clamps, super-applying mechanism opposite another position thereof, second gumming mechanism opposite another position of the clamps, and lining-applying mechanism opposite still another position thereof.

18. In book-making and other machines, a plurality of clamps, tracks carrying the clamps, means moving the clamps through an approximately helical path with an intermittent rotary and longitudinal motion, gumming and super-applying mechanism opposite different positions of the clamps, and continuously-driven mechanism operating the gumming and super-applying mechanism during the rests of the clamps.

19. In book-making and other machines, a continuously-driven driving-shaft, in combination with a revolving drum having longitudinal tracks, means intermittently revolving the drum from said shaft, a plurality of separate clamps carried by said tracks, continuously-driven cams, shifters operated by said cams during the rests of said drum, and then moving said clamps longitudinally of said tracks, and mechanism for performing successive operations incident to book-making opposite successive positions of said clamps and operating during the rests thereof.

20. In book-making and other machines, a revolving drum having longitudinal tracks, a plurality of clamps carried by said tracks, a continuously-driven driving-shaft, mechanism revolving said drum intermittently from said shaft, mechanism shifting said clamps longitudinally of said drum, a cam-shaft continuously driven from said driving-shaft, and mechanism for performing successive operations incident to book-making driven by said cam-shaft and operating during the rests of said drum.

21. In book-making and other machines, an intermittently-revolving drum having a plurality of longitudinal tracks, a plurality of clamps carried by said tracks and movable to successive positions longitudinally thereof, mechanisms for performing successive operations incident to book-making opposite successive positions of such clamps, and means for preventing operation of said mchanisms opposite one of said positions.

22. In book-making and other machines, a plurality of clamps, and means carrying them through a substantially helical path and holding them at successive positions therein, in combination with mechanisms opposite said positions for performing successive operations incident to book-making respectively, and means for preventing operation of any of said mechanisms.

23. In book-making and other machines, the improved clamp consisting of a surrounding frame, clamping-plates carried thereby, means locking said plates in the clamped position, and means automatically unlocking said plates.

24. In book-making machines, the improved book-clamp consisting of a surrounding frame, oppositely-movable clamping-plates carried thereby, means automatically moving such plates toward and from the clamping positions, and means equalizing such movements.

25. In book-making and other machines, the improved clamping mechanism consisting of oppositely-moving clamping-plates, means for locking such plates in any position, yielding pressers for pressing the plates against the object to be clamped, carriers for said pressers having a predetermined movement of greater extent than necessary for the pressers, springs between the carriers and pressers, yielding to permit the greater movement of the former, and means controlled by said carriers for automatically actuating said locking means when said clamping-plates are pressed against the object to be clamped.

26. In book-making and other machines, the improved clamping mechanism consisting of oppositely-moving clamping-plates, means for locking such plates in any position, yielding pressers for pressing the plates against the object to be clamped, carriers for said pressers having a predetermined movement of greater extent than necessary for the pressers, and springs between the carriers and pressers yielding to permit the greater movement of the former, said carriers operating said lock by their continued movements after the arrest of said pressers.

27. In book-making and other machines, the improved clamping mechanism consisting of clamping-plates, a yielding presser, a carrier movably carrying said presser, springs between the carrier and presser, means moving the carrier a predetermined distance greater than the necessary movement of said presser, an adjustable connection between the carrier and such means, and means controlled by said carrier for automatically locking said plates when the article is clamped between them.

28. For book-making and other machines, the improved clamping mechanism consisting of a frame having guideways, clamping-plates carried by said guideways and movable within said frame, cams locking said plates to said frame, and means automatically releasing said cams.

29. For book-making and other machines, a clamping mechanism consisting of a frame having guideways, movable plates within said frame engaging said guideways, cams for locking said plates to the frame, and means for automatically setting said cams.

30. In book-making and other machines, the improved clamping mechanism consisting of a frame, clamping-plates movably carried thereby, means for closing said plates against an object, means for automatically locking said plates when closed, and means for automatically releasing said plates.

31. For book-making and other machines, a clamp consisting of a frame adapted to slide in a track, clamping-plates movably carried thereby, means for closing said plates disposed in the path of movement thereof, means for locking said plates when closed, and an automatic tripper adapted to be operated during the movement of said frame to unlock said plates.

32. In clamping mechanism for book-making and other machines, a frame adapted to move in tracks, movable clamping-plates carried thereby, means for closing said plates, means for locking the plates closed, and a lock-operating device traveling with such frame and adapted to be operated by the movement thereof to insure locking of plates.

33. For book-making and other machines, a gumming mechanism comprising a reciprocating gummer, movable into and out of contact with the object to be gummed, and means tilting said gummer at its extremes of movement, whereby the gummer skips the edge of the object in advancing thereto and applies gum from its middle outwardly to one end with one stroke and from its middle to the opposite end with another stroke.

34. In gummers for book-making and other machines, an oscillating gum-applier $M^5$, means for moving it a greater distance than the length of the object to be gummed, and means oscillating it beyond the extremities of the object to be gummed, 35. In gummers for book-making and other machines, an oscillating gummer $M^5$, a carriage $M^6$ thereof, a track for said carriage, means moving the carriage and gummer outwardly to a gum-box and upwardly to the object to be gummed, and oscillating the gummer.

36. The improved gummer for book-making and other machines, comprising a gum-brush, a movable carriage therefor, a belt $M^{19}$ holding said carriage, rollers $M^{20}$ carrying said belt, and means reciprocating said carriage.

37. In gummers for book-making and other machines, an oscillating gum-applier, a carriage to which it is fulcrumed, an oscillating arm $M^7$, means moving said arm, and a lost-motion connection between said arm and applier transmitting a part of the motion of the arm to the applier to oscillate and reciprocate the latter.

38. In super-appliers and the like for book-making and other machines, a super-holding box and means for intermittently moving it, in combination with a bottom for carrying the supers in said box, and means for moving it a greater distance than the movement of the box.

39. In super-appliers and the like for book-making and other machines, a super-holding box and means for intermittently moving it, in combination with a bottom for carrying the supers in said box, and yielding means for moving it a greater distance than the movement of the box.

40. In super-appliers and the like for book-making and other machines, a box for holding supers, a movable bottom for carrying the supers therein, means advancing said bottom to successive upward positions in said box as the supers diminish, and catches for holding the bottom in such positions, said means reciprocating the bottom upwardly and downwardly relatively to the box from its various positions therein for advancing the top super toward the book.

41. In a super-applying and other mechanism, a holding-box and a movable bottom therein, in combination with means for moving the bottom within the box, and means for reciprocating the bottom and box together.

42. In super-applying and other mechanism a movable box and a movable bottom therein, means for moving the box and bottom together, and means for independently moving the bottom, in combination with means catching the bottom at successive positions within the box and limiting its receding movement thereon.

43. In super-applying and other devices, a bottom for holding a pile of supers, means for lifting said bottom, a yielding connection between the bottom and lifting means, catches for holding the bottom at successive points in its range of movement, said lifting means being automatically adjustable to lift the bottom from its successive positions.

44. In super-applying and other mechanism, a bottom for holding a pile of supers, a lifter for said bottom, springs between the lifter and bottom, a toggle for operating the lifter, and a ratchet-and-pawl connection between the toggle and the lifter for adjusting the throw of the toggle to the position of the lifter.

45. In super-applying and other mechanism, a movable carrier for a pile of supers, posts N for said carrier, slideways $N^8$ for said posts, a toggle $N^{11}$ connected at its respective extremities to said posts and ways, and means for actuating said toggle for lifting and lowering the holder, combined with means for progressively advancing the supers in the holder.

46. In super-applying and other mechanism, differential cams $N'$, $N^2$, connecting-rods $N^{13}$, $N^{22}$ operated respectively by said cams, toggles $N^{11}$, $N^{17}$ operated respectively by said rods, a holder for the supers operated by the toggles $N^{11}$, and a bottom carrying the supers operated by said toggles $N^{17}$.

47. In gum-appliers for book-making and other machines, a gummer and a track therefor having a portion substantially parallel with the object to be gummed and receding inclines at the extremities of such object, in combination with means carrying said gummer along said track, whereby the gummer will not apply over the edges of the track.

48. In gum-appliers for book-making and other machines, a gummer and a yielding track therefor having a portion substantially parallel with the object to be gummed and receding inclines at the extremities of such object, in combination with means carrying said gummer along said track, whereby the gummer will not apply over the edges of the track.

49. In gummers for book-making and other machines, a gum-roller $O^6$, a track $O^3$ therefor, a post $O^2$ yieldingly carrying said track, a swinging arm $O^8$, and a connection between said arm and roller reciprocating the latter in said track.

50. The improved lining-applier for book-making and other machines, comprising a lining-feeder, a lining-cutter, a presser-plate beyond the latter, said feeder delivering said lining to said presser-plate, means for operating said cutter, means subsequently lifting said plate to apply the lining thereon to an adhesive object, means holding said lining on said plate, and means intermittently actuating said parts to apply the lining to successive objects.

51. The improved lining-applier, comprising trimming-rolls $P^5$, intermittently-driven feed $P^6$, a cutter operated during the rests of said feed and comprising a presser $P^{19}$, a blade $P^7$, means moving said blade, and a spring yieldingly transmitting the motion of the blade to the presser, in advance of the blade and means supporting the severed lining and applying it to an object, and means holding said lining thereon before application.

52. The improved lining-applier consisting of a yielding presser $P^8$ having a perforated top and hollow interior, a reciprocating carrier $P^{24}$ therefor, an air-pump $P^{29}$, a piston $P^{30}$ therein operated with said carrier, whereby said pump exhausts by the upward movement of said carrier a connection between the exhaust side of said pump and said presser, and an air-inlet $P^{32}$ for said pump at the extreme movement of said piston, whereby the lining is held to the presser before its application and released thereafter.

53. In lining-appliers, a reel $P^4$, intermittently-driven feed-rolls for feeding a lining therefrom, a cutter beyond said rolls, a presser adjacent to said cutter and adapted to receive the severed lining from said cutter, means holding said lining thereon, a cam $P^3$ operating said cutter during the rests of said feed, and a cam $P'$ operating said presser after operation of said cutter.

54. For book-making and other machines, mechanism for pressing a lining on a book and for like purposes, comprising an oscillating and reciprocating member for bearing against the lining, a frame carrying such member means for reciprocating such member, and means for oscillating it at the extremities of its movements.

55. For book-making and other machines, a brush $Q'$, a holder $Q^9$ therefor, a carrier $Q^{11}$ for the holder, tracks in which said carrier reciprocates, and a lost-motion connection between the carrier and holder permitting oscillation of the brush at the extremities of its movements.

56. In book-making and other machines a frame A having bearings $a$ and $a'$, in combination with a revolving drum D having a hollow hub $a^6$ carried by the bearings $a$, a drum E revolving eccentrically of the drum D, and a shaft $b$ for the drum E traversing the hub of the drum D and mounted in the bearings $a'$.

57. In book-making and other machines a drum D having a hollow hub $a^6$ having internal gear-teeth, in combination with a frame A having a hollow bearing for said drum, a driving-shaft mounted eccentrically to said drum traversing said bearing and hub and carried by said frame, and internal gears between said shaft and drum driving the drum from the shaft.

58. In book-making and other machines, the drums D, E and F, a frame carrying said drums, a driving-shaft B, intermittent driving mechanism G driving the drums from the shaft, tracks T on the drums, clamps I sliding longitudinally of the tracks and revolving with the drums, a support U having fixed tracks coinciding with and extending between the tracks of the drums D and F, means for sliding the clamps in the tracks, and means for feeding and discharging books to the clamps at said fixed tracks.

In witness whereof we have hereunto signed our names in the presence of two subscribing witnesses.

WILLIAM H. MARVIN.
ROBERT R. VESSEY.

Witnesses:
GEORGE H. FRASER,
FRED WHITE.